United States Patent [19]
Dahlback

[11] Patent Number: 6,149,738
[45] Date of Patent: Nov. 21, 2000

[54] FUEL BOXES AND A METHOD FOR MANUFACTURING FUEL BOXES

[75] Inventor: Mats Dahlback, Vasteras, Sweden

[73] Assignee: ABB Atom AB, Vasterås, Sweden

[21] Appl. No.: 09/101,281

[22] PCT Filed: Apr. 21, 1997

[86] PCT No.: PCT/SE97/00667

§ 371 Date: Apr. 13, 1998

§ 102(e) Date: Apr. 13, 1998

[87] PCT Pub. No.: WO97/40659

PCT Pub. Date: Nov. 6, 1997

[30] Foreign Application Priority Data

Apr. 26, 1996 [SE] Sweden .................................. 9601594

[51] Int. Cl.[7] ...................................................... C22F 1/18
[52] U.S. Cl. ........................... 148/421; 148/407; 148/421
[58] Field of Search ..................................... 148/672, 407, 148/421; 420/422

[56] References Cited

U.S. PATENT DOCUMENTS

| | | | |
|---|---|---|---|
| 4,238,251 | 12/1980 | Williams et al. ........................ | 148/133 |
| 4,521,259 | 6/1985 | Eucken ..................................... | 148/672 |
| 5,361,282 | 11/1994 | Adamson et al. ....................... | 376/443 |
| 5,478,419 | 12/1995 | Dumas et al. ........................... | 148/672 |
| 5,677,937 | 10/1997 | Vesterlund et al. ..................... | 148/672 |
| 5,887,045 | 3/1999 | Mardon et al. ......................... | 420/422 |

FOREIGN PATENT DOCUMENTS

| | | | |
|---|---|---|---|
| 0 626 465 A1 | 11/1994 | European Pat. Off. . | |
| 62-70556 | 4/1987 | Japan ..................................... | 148/672 |
| 452 479 | 11/1987 | Sweden . | |
| 1 537 930 | 1/1979 | United Kingdom . | |

OTHER PUBLICATIONS

Adamson et al., Zirconium in the Nuclear Industry, ASTM Special Technical Publication 939, Jun. 1985, pp. 284–291.

*Primary Examiner*—George Wyszomierski
*Attorney, Agent, or Firm*—Pollock, Vande Sande & Amernick, R.L.L.P.

[57] ABSTRACT

A fuel box for a nuclear fuel bundle for a boiling water reactor is manufactured by zirconium alloy plates. The plates have a composition such that the material after beta quenching and heat treatment will have a ductile, so called basketweave structure.

17 Claims, No Drawings

FUEL BOXES AND A METHOD FOR MANUFACTURING FUEL BOXES

FIELD OF INVENTION

The present invention relates to the field of fuel boxes of a zirconium alloy for use in nuclear fuel assemblies intended for boiling water reactors, and to a method for manufacturing such boxes.

BACKGROUND OF THE INVENTION

Nuclear fuel bundles for boiling water reactors are usually surrounded by a fuel box. The main functions of the fuel box are to provide mechanical stability to the bundle and to conduct the cooling water so that adequate cooling of the fuel bundle in all its parts is obtained.

The fuel box has a square cross section and surrounds the bundle along all of its length. At the bottom of the fuel box a transition piece is attached, and at the bottom thereof there is a guide intended to be arranged in the assembly supporting plate of the reactor. The box may also be provided with an inner, usually cruciform structure which axially divides the fuel bundle into four sub-bundles.

The shape accuracy of the fuel box is of the utmost importance for its function. It is also important for the box to have good corrosion resistance during reactor operation. The box has large surfaces in contact with the reactor coolant. Flaking corrosion products should not form on the box surfaces since these products may spread radioactivity to various systems in the reactor. There should also be a good margin with respect to weakening of the box wall caused by the metal being transformed into oxide.

During manufacturing of a fuel box, thin rectangular plates of a zirconium alloy constitute the starting material. Zirconium alloys widely used in nuclear reactors are Zircaloy-2 and Zircaloy-4. Zircaloy-2 contains 1.2 to 1.7% tin, 0.07 to 0.20% iron, 0.05 to 0.15% chromium, 0.03 to 0.08% nickel, 0.09 to 0.16% O and Zircaloy-4 contains largely the same alloying elements but lacks nickel and contains somewhat more iron, 0.018 to 0.24%. Also other zirconium alloys for reactor purposes such as, for example, a zirconium-base alloy containing about 1% tin, about 1% niobium and about 0.2% iron, or a zirconium alloy containing about 1% niobium, 1% tin, 0.5% iron and 0.2% chromium may be used as starting material. The alloys comprise incidental impurities, normally in the range of 500 to 1500 ppm.

The box is manufactured by bending two plates into U-shape. The bending is carried out with a conventional method and may be preceded by a heat treatment of the plate to increase its ductility. Two U-shaped plates are turned so as to face each other and are welded together along the folded-up parts of the plates, so as to obtain a box with a square cross section. The shaping of the box into the finished dimension is made by heat-treating the box on a device in a conventional manner.

To improve the corrosion properties of the material, it is known, according to GB 1 537 930 , to heat the material to a temperature exceeding 900° C. so that a phase transformation occurs in the material from hexagonal alpha phase to cubic beta phase, and thereafter to cool the material rapidly, so-called beta quenching. Phase transformation occurs at about 870° C., and above about 930° C. the material is completely transformed into beta phase. The temperature may vary somewhat depending on what alloying elements the zirconium contains, however all zirconium alloys for reactor purposes are low alloy elements so the variation in phase transformation temperature is relatively small.

British patent GB 1 537 930 describes that the plate is to be heated to a temperature of at least 900° C. by allowing the temperature rise from 500° C. to the desired heat-treatment temperature and the heat treatment is to take at most 60 seconds, whereafter the plate is to be cooled at least 200° C. in at most 60 seconds. During cooling of the plate, the material forms an acicular structure, so called Widmanstatten structure.

U.S. Pat. No. 4,238,251 describes heat treatment of nuclear fuel components for improving the corrosion resistance in boiling water reactors.

A fuel box in a finished or almost finished form is heat-treated at a temperature such that an incipient phase transformation from alpha to beta takes place, whereupon the box is rapidly cooled to about 700° C. This heat treatment, so-called beta quenching, brings about a segregation of intermetallic particles in a two-dimensional pattern. The heat treatment is primarily to take place at a temperature higher than 965° C. and should not occur at a temperature exceeding 1100° C. since this is too energy-demanding without providing structural advantages compared with heat treatments at lower temperatures. The box should be maintained at the heat-treatment temperature for about 3 to 30 seconds and then be quenched to a temperature lower than 700° C. at a rate of about 200° C. per second.

U.S. Pat. No. 5,361,282 also describes a heat treatment of zirconium plates for fuel boxes to achieve good corrosion resistance in a boiling-water reactor environment. The heat treatment means that the material is heated to 980° C. to 1120° C. and is kept at the heat-treatment temperature for 0.25 seconds to 30 minutes, whereafter the material is cooled down to a temperature lower than 815° C. at a cooling rate of 6–240° C. per second. The beta quenching heat treatment leads to a random distribution of the crystals in the hexagonal alpha structure. A random distribution of crystals will decrease the tendency of the fuel box to bow in reactor service.

A problem with the heat treatments which are conventionally used for improving the corrosion resistance of the box material in a boiling-water reactor environment is that the it is difficult to bend the box plate to the proper shape after the heat treatment. Because of the structure which is formed after the heating to beta phase with a subsequent rapid cooling to alpha phase, cracks easily occur in the material when this is to be bent into U-shape before the manufacture of a fuel box. Nor does a preliminary heat treatment of the material to increase the ductility give sufficiently good results for the material to be capable of being bent without the risk of cracking. In addition, the possibility of preheating the material is limited by the fact that this heat treatment may deteriorate the corrosion properties of the material.

SUMMARY OF THE INVENTION

The present invention includes a fuel box and a method for manufacturing zirconium alloy plates for such fuel boxes. The method includes a heat treatment of the plates which are beta-quenched, that is, are heated to the beta-phase region and thereafter rapidly cooled to the alpha-phase region to improve the corrosion properties of the material in a boiling-water reactor environment, and this means that the ductility of the material is not deteriorated by the heat treatment.

The method according to the invention is based on the realization that a special form of Widmanstatten structure, the so-called "basketweave" structure and in particular a finely lamellar basketweave structure is favorable for carrying out bending of box plate without the risk of cracking. Achieving a finely lamellar basketweave structure with good corrosion and bending properties requires control of the composition of the zirconium alloy and that the heat treatment is carried out with a controlled heat-treatment temperature and cooling rate. The invention will be described in greater detail below.

During heat treatment of zirconium alloys in the beta-phase temperature range (980° C. to 1120° C.) followed by rapid cooling to alpha phase, in principle two types of Widmanstatten structures may arise, so-called basketweave structure and parallel-plate structure. The basketweave structure is characterized by a plurality of nucleus formation points and in that the lamellae have grown in several different directions so that the structure resembles a "basket pattern". The parallel-plate structure exhibits grains with lamellae which have grown in parallel through a large part of the beta grain out from the grain boundaries.

The formation of the basketweave structure is associated with a high content of carbon, silicon or phosphorus in the material. These substances are not completely soluble in the beta phase as most alloying elements but may form nucleus formation points for the phase transformation during the temperature reduction. It has been noted that when silicon is the main impurity, rapid cooling from 1050° C. leads to a parallel-plate structure, whereas cooling from a higher temperature leads to a basketweave structure (ASTM STP 939 Influence of Impurities and Temperature on the Microstructure of Zircaloy-2 and Zircaloy-4 after the Beta to Alpha Phase Transformation, Charquet et al.). Basketweave structure also occurs in materials with impurity residues from the zirconium manufacture in the form of stringers of volatile substances such as chlorine, magnesium, calcium and potassium, which have been included in the material during the solidification. Normally, remelting of zirconium is carried out to avoid having volatile impurities remaining in the material.

To achieve a beta-quenched material which is ductile and has a basketweave structure, it is suitable to ensure that the zirconium contains small amounts of volatile impurities such as primarily chlorine, but also magnesium, calcium, sodium and potassium may occur. The contents of these substances should be low, the amount of chlorine should be within the interval of 0.5 to 10 ppm and the amount of other volatile impurities should be within the interval of 5 to 20 ppm. The melting conditions must be adjusted in order not to obtain too low a content of these substances. Also, the percentage of recirculated material should be kept below 50% since this material contains lower contents of volatile impurities than "newly manufactured" material.

Other elements favorable for the formation of the basketweave structure are carbon, silicon, and phosphorus. The carbon content should be at least 100 ppm and lower than 200 ppm, the silicon content at least 50 ppm and lower than 120 ppm, and the phosphorus content at least 1 ppm and lower than 30 ppm.

The formation of a favorable structure after beta quenching is further improved by a controlled manufacture of the material. The manufacturing is important since it influences distribution and size of the precipitates and inclusions which have low solubility in the beta-phase region and which thus act as nucleus-formation points during the phase transformation. Of special importance are the heat-treatment and hot-working operations which the material undergoes during the manufacture into plate.

Also, heat treatments of the plate which are carried out to manufacture boxes of the plates may influence the properties of the material.

Another factor of importance is the oxygen content of the zirconium alloy. It has been discovered that during beta quenching an enrichment of the oxygen content in the lamellae will occur. If the oxygen content is kept low, at around 600 to 1300 ppm and preferably 900 to 1100 ppm, the ductility of the material is improved without adverse effect on the strength of the material.

During the manufacture of the plate, the hot working of the ingot is important. During this working, a degradation of the solidification structure occurs. The hot working normally occurs in two steps. The first working may occur at 1100° to 1200° C. in order for the impurities of silicon to dissolve and be evenly distributed in the matrix and to equalize macro-segregations in the structure.

A second working step is made in the alpha-phase temperature range at 650 to 800° C.

In an intermediate step after the working in the beta-phase temperature range, it is favorable to heat-treat the material at a low temperature in the alpha-phase region to obtain nucleus formation of silicides. This heat treatment may be made within the interval of 450 to 550° C. for two to five hours.

Other hot working operations which the material undergoes during the manufacturing, such as hot rolling and/or extrusion, should be carried out at such time/temperature conditions in order for the silicides not to grow and coalesce.

During the final beta quenching of the plate in the finished dimension or almost finished dimension, a fast grain growth takes place during the processing in the beta-phase region. Intermetallic precipitates between zirconium and the alloying elements are dissolved in the beta phase, and there is therefore a considerable risk that very large grains which have an unfavorable influence on the structure after cooling are formed. To reduce the grain growth, according to the invention the material shall be maintained for a very short time, about five to fifteen seconds, in the beta-phase region. The composition of the material, and particularly the quantity of silicon, carbon and phosphorus, together with the quantity of volatile impurities such as chlorine and also magnesium, calcium, sodium and potassium, are important for controlling the structure. The cooling rate from the beta-phase temperature has a great influence on the corrosion resistance of the material, and it has proved that the cooling rate should be moderate to obtain good corrosion resistance. A cooling rate within the interval of 5 to 50° C. per second gives a good structure and good corrosion properties. The cooling rate should be below 100° C. per second since a very rapid cooling has proved to greatly deteriorate the corrosion resistance of the material.

In order to improve corrosion properties and to restore the flatness of the product after beta quenching the material is heat-treated after the beta quenching at a temperature above 600° C. in a static furnace or 700° C. in a continuous furnace, and in both cases not above 800° C. It is advantageous to cool the material fairly rapidly after this final heat treatment. A cooling rate exceeding 5° per second is preferred.

During the manufacture of boxes, the plates should not be subjected to heat treatments in the temperature range above 770° C.

DETAILED DESCRIPTION OF THE PREFERRED EMBODIMENTS

As starting material, standard sponge zirconium with about 40% recycling material is used, which is at least double melted in a conventional manner. During the ingot manufacture, the alloying elements are added to form Zircaloy-2 or Zircaloy-4. The manufactured ingot is forged in the beta-phase region, at a temperature of around 1150° C., to dissolve and distribute phases containing silicon.

Thereafter, a heat treatment at 450 to 500° C. may be made for the purpose of precipitating small suicides and secondary-phase particles comprising the alloying elements. This heat treatment may also be omitted.

Conventional forging to reduce the dimensions of the material is made in the alpha-phase region to prevent the silicides from growing.

The forging is reduced additionally by hot rolling for example after preheating at 950° C. for 15 minutes or 750° C. for 45 minutes to a thickness of about 30 to 20 mm followed by a second hot-rolling operation to a plate thickness of about 6 mm at a maximum temperature of 650° C.

A 1020° C. solution treatment for 5 to 10 minutes followed by rapid cooling may be added at 30/20 mm thickness in order to homogenize the alloying elements, such as tin, iron, chromium or nickel.

The temperature during the hot-rolling steps is kept relatively low to avoid the growth of silicides and other impurities.

Thereafter, the substance is cold-rolled in a number of steps down to the finished dimension. Between each cold-rolling step, a heat treatment is carried out at about 630° C. in a static furnace or 730° C. in a continuous furnace.

During the finishing beta quenching, a structure which improves the corrosion properties and the ductility is to be achieved. The material is heat-treated by allowing a band of the material to pass through a heat source, for example an infrared lamp, and thus be heated to about 1050° C. for about 10 seconds. Thereafter, the material is cooled when the band leaves the heating zone. The cooling occurs at a rate of about 25° C. per second.

The plate material exhibits a microstructure which is characterized by a finely lamellar basketweave structure.

The material is heat-treated after the beta quenching at a temperature above 600° C. in a static furnace or 700° C. in a continuous furnace, and in both cases not above 800° C.

To manufacture boxes, the plates shall first be bent into U-shape. The bending may be made without preheating of the plate. Crossplates for boxes with an internal water cross may be preheated at about 200° C. before being bent and embossed.

To prevent the risk of cracking during the bending operation, the plates must have a good ductility. The occurrence of even very small cracks in the material leads to the material having to be rejected. Microcracks may constitute a problem since they may be difficult to detect. The ductility of the material must thus be sufficiently good to prevent the occurrence of cracking.

The bent box halves are joined together by means of TIG welding along the respective sides. The box is shaped to obtain the desired straightness and square dimension. The shaping is performed in a conventional manner by fitting the box onto a mandrel of stainless steel, which is true to gauge, and thereafter heating the package to about 600° C. Since the steel expands more than the zirconium alloy, the dimensions of the mandrel are imparted to the box.

What is claimed is:

1. A method for manufacturing zirconium alloy plate material for manufacturing fuel boxes for boiling water reactors, the method comprising:

providing a material that comprises zirconium alloy; volatile impurities comprising 1 to 10 ppm chlorine and 5 to 20 ppm of at least one of magnesium, calcium, sodium and potassium; 100 to 270 ppm carbon; 50 to 120 ppm silicon; and 1 to 30 ppm phosphorus;

working the material to a finished or nearly finished dimension;

beta quenching the material to give the material a basketweave structure; and heat treating the material at a temperature of 600° C. to 800° C. in a static furnace or 700° C. to 800° C. in a continuous furnace.

2. The method according to claim 1 wherein working the material comprises at least one of forging, hot rolling, extrusion, cold-rolling, and heat treatment.

3. The method according to claim 1, wherein a cooling rate of the material after the heat treating exceeds 5° C. per second.

4. The method according to claim 1, wherein the material comprises 600 to 1300 ppm oxygen.

5. The method according to claim 1, wherein the material comprises 900 to 1000 ppm oxygen.

6. The method according to claim 1, wherein the beta quenching is carried out at a final thickness of the material, and wherein the beta quenching comprises heating the material to 900° C. to 1100° C. for at most 15 seconds followed by cooling at a cooling rate below 100° C. per second.

7. The method according to claim 6, wherein the cooling rate is 5° C. to 50° C. per second.

8. The method according to claim wherein the working step comprises forging and further comprising:

heat treating the material between two forging operations at 450° C. to 500° C. to precipitate silicides and secondary phase particles.

9. A fuel box manufactured by a method comprising:

providing a material that comprises zirconium alloy; volatile impurities comprising 1 to 10 ppm chlorine and 5 to 20 ppm of at least one of magnesium, calcium, sodium and potassium; 100 to 270 ppm carbon; 50 to 120 ppm silicon; and 1 to 30 ppm phosphorus;

working the material to a finished or nearly finished dimension;

beta quenching the material to give the material a basketweave structure; and heat treating the material at a temperature of 600° C. to 800° C. in a static furnace or 700° C. to 800° C. in a continuous furnace.

10. The fuel box according to claim 9, wherein working the material comprises at least one of forging, hot rolling, extrusion, cold-rolling, and heat treatment.

11. The fuel box according to claim 9, wherein a cooling rate of the material after the heat treating exceeds 5° C. per second.

12. The fuel box according to claim 9, wherein the material comprises 600 to 1300 ppm oxygen.

13. The fuel box according to claim 9, wherein the material comprises 900 to 1000 ppm oxygen.

14. The fuel box according to claim 9, wherein the beta quenching is carried out at a final thickness of the material, and wherein the beta quenching comprises heating the material to 900° C. to 1100° C. for at most 15 seconds followed by cooling at a cooling rate below 100° C. per second.

15. The fuel box according to claim 14, wherein the cooling rate is 5° C. to 50° C. per second.

16. The fuel box according to claim 9, wherein the working step comprises forging wherein the material is heat treated between two forging operations at 450° C. to 500° C. to precipitate silicides and secondary phase particles.

17. A method for manufacturing zirconium alloy plate material for manufacturing fuel boxes for boiling water reactors, the method comprising:

providing a material that comprises zirconium alloy; volatile impurities comprising 1 to 10 ppm chlorine and 5 to 20 ppm of at least one of magnesium, calcium, sodium and potassium; 100 to 270 ppm carbon; 50 to 120 ppm silicon; and 1 to 30 ppm phosphorus;

working the material to a finished or nearly finished dimension, the working comprising forging;

heat treating of the material is carried out between two forging operations at 450° C. to 500° C. to precipitate suicides and secondary phase particles;

beta quenching the material to give the material a basketweave structure; and heat treating the material at a temperature of 600° C. to 800° C. in a static furnace or 700° C. to 800° C. in a continuous furnace.

* * * * *